Oct. 11, 1938.  A. NAGEL  2,132,696
ROLL HOLDING CAMERA CONSTRUCTION
Filed May 29, 1937
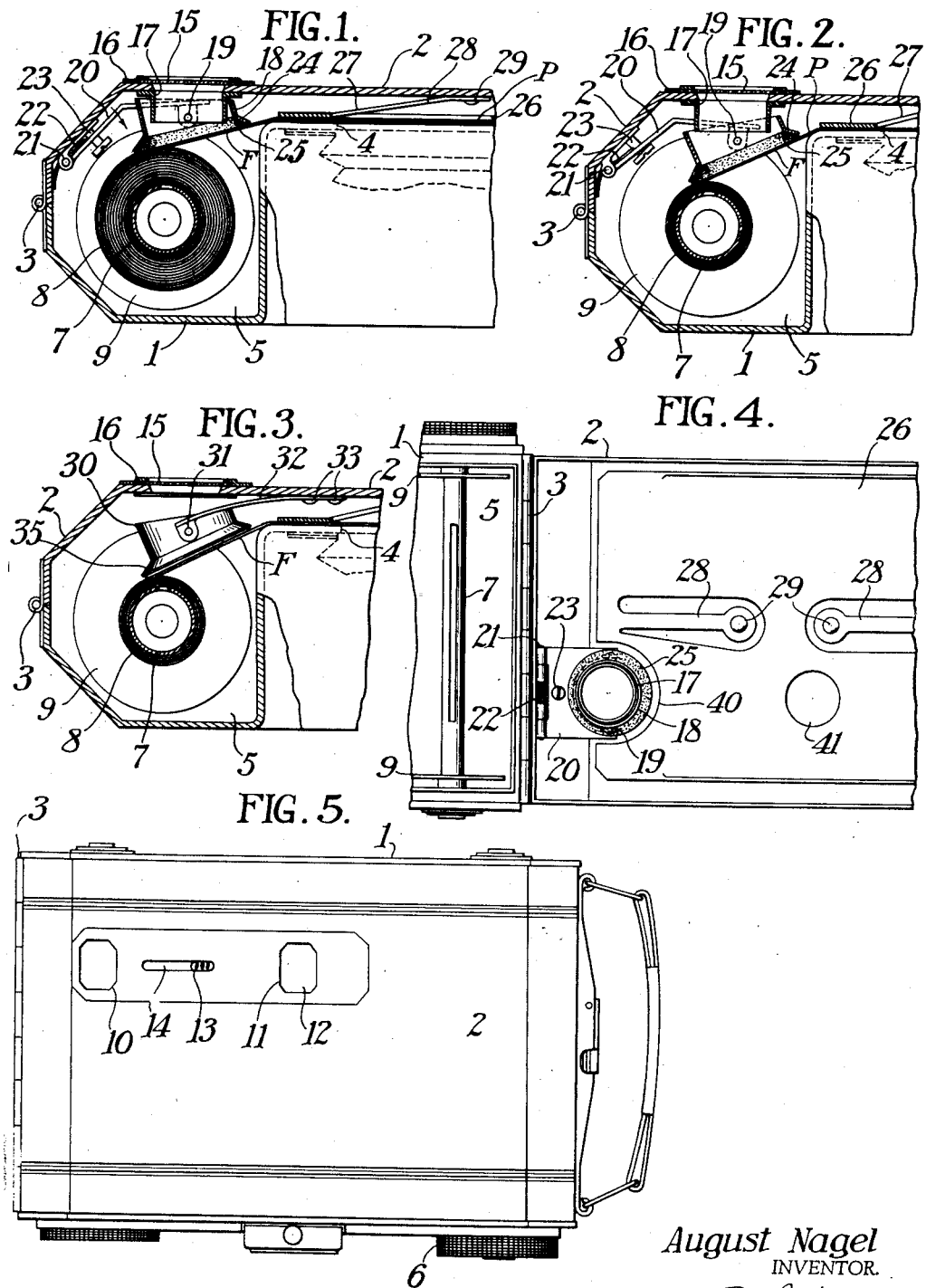
August Nagel
INVENTOR.
BY Newton M. Perkins
Donald H. Stewart
ATTORNEYS Patented Oct. 11, 1938

2,132,696

UNITED STATES PATENT OFFICE 2,132,696

ROLL HOLDING CAMERA CONSTRUCTION

August Nagel, Stuttgart, Germany, assignor to Eastman Kodak Company, Rochester, N. Y., a corporation of New Jersey Application May 29, 1937, Serial No. 145,500
In Germany September 25, 1936

7 Claims. (Cl. 95—31)

This application relates to photography and more particularly to photographic roll film cameras. One object of my invention is to provide a camera with a light-tight window through which the numerals on the film backing paper may be readily viewed. Another object of my invention is to provide a roll film camera with a telescopic connection between the viewing window in the camera back and the backing paper bearing the film numerals. Another object of my invention is to provide a movable means between the camera back and backing paper and reducing or minimizing the possibility of light spread inside of the camera to the film. Another object of my invention is to provide a spring pressed light confining member inside of the camera between the camera back and backing paper through which the reference characters on the film may be visible. Still another object of my invention is to provide a resiliently spaced backing paper contacting member adapted to surround the film backing paper numbers. A still further object of my invention is to provide a suitable window through which the reference characters on backing paper lying in the spool chamber may be satisfactorily viewed without fogging the film and other objects will appear from the following specification, the novel features being particularly pointed out in the claims at the end thereof.

In the drawing wherein like reference characters denote like parts throughout,

Fig. 1 is a fragmentary view partly in section showing a typical roll film camera constructed in accordance therewith embodying a preferred form of my invention.

Fig. 2 is a view similar to Fig. 1 but with the parts in a different position.

Fig. 3 is a view similar to the preceding figures but showing a different embodiment of my invention.

Fig. 4 is a fragmentary plan view of a portion of a roll holding camera with the camera back opened showing a preferred embodiment of my invention differing from that shown in the preceding views in including a different form of film pressure plate.

Fig. 5 is a rear elevation of the camera shown open in Fig. 4.

It is customary in roll holding cameras to provide spools of film in which convolutions of film and backing paper are wound together into a light-tight package. The backing paper is usually provided with a series of reference numerals indicating when areas of film lie across an exposure frame in the camera so that an operator, by winding from one numeral to another, positions the various areas of film for exposure.

In some cameras, more than one window is provided in the camera back so that more than the usual number of exposures can be produced on the standard types of film which are not equipped with additional markings on the film backing paper.

Where such added windows are necessary, it sometimes occurs that an opening must be provided opposite a spool chamber rather than opposite the exposure frame. This has the disadvantage in that it is impossible with the usual type of window to prevent light from scattering between the window and backing paper in such a direction that some of the light rays reach the film lying beneath the backing paper. Since the convolutions of film and backing paper alter as they are wound from one spool to another, the distance between the window in the camera back and the film backing paper is correspondingly altered. In accordance with my present invention, I have provided a light trapped opening through which the reference characters can be readily viewed, this light trapped opening preferably including a cylindrical member which is always pressed against the film backing paper and which is provided with a substantially light-proof connection therewith. In accordance with a preferred embodiment of my invention, the light-trapped opening may consist of telescopic members so arranged that they may expand and contract and in all positions exclude undesirable light rays from scattering and thus passing to the film.

Coming now to the embodiments of my invention shown in the drawing, in Fig. 5 I have shown a typical camera 1 having a camera back 2 which may be hinged at 3 to the camera body so that it may be swung open to expose the usual exposure frame 4 and spool chambers 5. A spool chamber is of course provided at each end of the camera body 1, one spool chamber being for a supply roll of film and the opposite spool chamber being for a take-up roll of film.

As indicated in Fig. 5, a film winding key or knob 6 may be provided for turning the take-up spool to wind the film from the supply spool which is shown at 7 and which carries the usual convolutions 8 of paper and film.

The backing paper P lies toward the camera back 2 and the film F lies toward the exposure frame 4 beneath the backing paper. The spool 7 may have the usual flanges 9 against which the paper P and film F may lie to prevent light from entering between these convolutions.

As indicated in Fig. 5, the camera back 2 may be provided with two windows 10 and 11, the former being located above a spool chamber 5 and the latter being located above the exposure frame 4. If desired, these two windows may be closed by a shutter member 12 which may be operated by means of the knob 13 which may be moved through the slot 14 to open and close the windows.

Referring to Fig. 1, the window 10 may be covered with a non-actinic sheet of material 15 which may be of red or green cellulosic material which may be held in place by means of a frame member 16. Beneath the window 15 is a downwardly extending tubular member 17 affixed to the camera back 2. Thus light entering through the window 15 would pass through the tubular member 17 and would be prevented from scattering around through the spool chamber 5 by means of a second tubular member 18 which is preferably hingedly attached at 19 to an arm 20 which is hingedly attached at 21 to the camera back.

A spring 22 normally turns this arm in the direction shown by the arrow and the movement of the arm is limited by the stud 23. Thus, the outwardly flared inner edge 24 of the tubular member 18 is pressed against the film backing paper P.

This outwardly flared edge is preferably faced with a soft felt or plush ring 25 so that a substantially light-tight connection is formed between the inner end of the tubular member 18 and the film backing paper. The members 18 and 19 are free to telescope—that is, as indicated in Fig. 2, they may move from the relatively closed position shown in Fig. 1 to the relatively separated position shown in Fig. 2—this movement being necessary to mask off light when the convolutions on the film spool 7 are of large diameter as well as when the convolutions are reduced to a small diameter.

The film and backing paper are pressed flat over the exposure aperture by means of a pressure plate 26 which is pressed by means of spring arms 27 into contact with the film and backing paper. These spring arms are bent at 28 rearwardly and may be attached at 29 to the camera back 2.

While the embodiment of my invention shown in Figs. 1 and 2 is one of the most satisfactory types of light-tight connection, between the window in the camera back and the film backing paper, I have found that other embodiments may be made somewhat less expensively which are entirely satisfactory in practice. Accordingly the embodiment shown in Figs. 3 and 4 may be used in Fig. 3, the window 15 is the same as that previously described in that light retarding cellulosic sheeting covers the opening and is held in place by means of a frame 16. However, the tubular member 17 of the previous embodiments is omitted and I provide a single movable tubular shaped light trapping member 30 which is pivoted at 31 to a leaf spring 32 attached as by rivets 33 to the camera back 2. This member has an outwardly flared end 35 which may or may not be faced with fabric as in the preceding embodiments of my invention. It will, however, be held against the backing paper P by means of the leaf spring 32.

It might appear as if the opening between the window 15 and the tubular member 30 is of sufficient width to permit considerable light scatter. In practice, this has not been found to be true since apparently the chief difficulty in using windows in spool chambers of cameras is that the light is permitted to pass through the chamber 5 after being reflected from the backing paper. However, with a tubular light trapping member 30 pressed against the backing paper as by the spring 32, this reflection and particularly reflections along the surface of the film backing paper is prevented.

Referring to Fig. 4, the spool chamber 5 is provided with a spool 7 and a hinge 3 connects the camera back 2 to the camera body 1. The presser plate 26 is as described in the embodiment of my invention shown in Figs. 1 and 2 and is provided with a rounded cut-out portion 40 which gives sufficient clearance for the telescopically arranged tubular members 17 and 18, the latter being hingedly connected at 19 to the arm 20 hinged at 21 to the camera back. The stud 23, as above described, limits the movement of this arm.

It is obvious that where the window 12 lies close to the film backing paper, there is but little chance for light rays to scatter particularly if they have to pass through an opening 41 in a presser pad or plate 26. In such cases, it is not necessary to prevent light scattering. However, where the distance between the red window and the backing paper is considerable, I have found that one or more tubular light retarding members are necessary to prevent light scattering and with the telescopic type shown in Figs. 1 and 2 I have found that light scatter is entirely eliminated.

There is an additional advantage in providing a tubular member such as 18 or 30 which contacts with the film backing paper, because where the backing paper is spaced some distance from the rear window, some means of determining the proper position for the film backing paper numeral is necessary. When such a tubular member is held in contact with the paper, and the numeral is centered in the opening thus formed, the position of the film is as accurately determined as it is when the usual type of window lying close to the backing paper is used.

It is quite obvious that various different arrangements can be readily devised for closing or partially closing the gap between the inspection window in the camera back and the film backing paper and that different embodiments of my invention can be readily made to care for a variable distance between the window and the backing paper without departing from my invention as defined in the following claims.

What I claim is:

1. In a roll holding camera including an exposure frame and spool chambers adapted to receive spools, film, and backing paper with numbers thereon, the combination with a camera back which with the camera body forms walls enclosing the spool chambers and exposure frame, a window in a wall enclosing a spool chamber through which reference characters on film backing paper may be viewed and a pair of telescoping members mounted between the window and film backing paper for preventing light scatter from the window fogging the film.

2. In a roll holding camera including an exposure frame and spool chambers adapted to receive spools, film, and backing paper with numbers thereon, the combination with a camera back which with the camera body forms walls enclosing the spool chambers and exposure frame, a window in a wall enclosing a spool chamber through which reference characters on film backing paper may be viewed and a tubular member mounted adjacent the window, a second tubular member movably and telescopically mounted with respect to the first member and forming with it a substantially light tight passageway between the window and film backing paper through which numerals on the backing paper may be viewed.

3. In a roll holding camera including an exposure frame and spool chambers adapted to receive spools, film, and backing paper with numbers thereon, the combination with a camera back which with the camera body forms walls enclosing the spool chambers and exposure frame, a window in a wall enclosing a spool chamber through which reference characters on film backing paper may be viewed and a tubular member mounted adjacent said wall and including a portion in non-parallel relation to the window for engaging the film backing paper, and a spring mount for said tubular member adapted to press said member into engagement with the backing paper to prevent light scatter toward the edges of the film backing paper.

4. In a roll holding camera including an exposure frame and spool chambers adapted to receive spools, film, and backing paper with numbers thereon, the combination with a camera back which with the camera body forms walls enclosing the spool chambers and exposure frame, a window in a wall enclosing a spool chamber through which reference characters on film backing paper may be viewed and a tubular member mounted adjacent said wall and including a portion in non-parallel relation to the window for engaging the film backing paper, a fabric paper contacting member carried on the end of the tubular member engaging the backing paper, and a spring mount for said tubular member adapted to press said fabric surfaced member into engagement with the backing paper to prevent light scatter toward the edges of the film backing paper.

5. In a roll holding camera including an exposure frame and spool chambers adapted to receive spools, film, and backing paper with numbers thereon, the combination with a camera back which with the camera body forms walls enclosing the spool chambers and exposure frame, a window in a wall enclosing a spool chamber through which reference characters on film backing paper may be viewed and a tubular member mounted adjacent said wall and including a portion in non-parallel relation to the window for engaging the film backing paper, a hinged mount for said tubular member hingedly attached to a camera wall, a spring tending to turn said mount to engage the fabric surfaced tubular member with the film backing member whereby light scatter across the backing paper may be minimized.

6. In a roll holding camera including an exposure frame, spool chambers and walls enclosing the same, adapted to receive spools in each chamber and to have film and backing paper with numerals thereon drawn upwardly from one spool across the exposure frame and downwardly to the other spool, a film numeral viewing window in a camera wall enclosing a portion of a spool chamber and over backing paper extending upwardly from a film spool therein, a non-actinic covering for said window and a tubular member mounted between the window and backing paper and having an angularly disposed end adjacent said backing paper to retard light scatter.

7. In a roll holding camera including an exposure frame, spool chambers and walls enclosing the same, adapted to receive spools in each chamber and to have film and backing paper with numerals thereon drawn upwardly from one spool across the exposure frame and downwardly to the other spool, a film numeral viewing window in a camera wall enclosing a spool chamber and over at least a portion of a film spool therein, a non-actinic covering for said window, a hingedly mounted tubular member mounted between the window, backing paper and spool flanges through which the numerals in the backing paper may be viewed, and a spring for pressing said number lightly against the backing paper, said spring having sufficient resiliency to hold the tubular member in contact with the backing paper near the spool and to compensate for the varying diameter of the backing paper on said film spool as the backing paper moves relatively thereto.

AUGUST NAGEL.